(12) United States Patent
Bosten et al.

(10) Patent No.: US 6,250,859 B1
(45) Date of Patent: Jun. 26, 2001

(54) ROUTER TEMPLATE GUIDE ALIGNMENT SYSTEM AND METHOD

(75) Inventors: Donald R. Bosten; Randy G. Cooper; Waymon L. McNeal, all of Jackson; James T. Stolzer, Milan, all of TN (US)

(73) Assignee: Porter-Cable/Delta, Jackson, TN (US)

( * ) Notice: Subject to any disclaimer, the term of this patent is extended or adjusted under 35 U.S.C. 154(b) by 0 days.

(21) Appl. No.: 09/113,591

(22) Filed: Jul. 10, 1998

Related U.S. Application Data (63) Continuation-in-part of application No. 08/891,465, filed on Jul. 10, 1997, now Pat. No. 5,993,124.

(51) Int. Cl.$^7$ ...................................................... B73C 3/00
(52) U.S. Cl. ............................................................ 409/131
(58) Field of Search ................................... 409/180, 182, 409/131, 132; 144/134.1, 135.2, 371, 1.1

(56) References Cited

U.S. PATENT DOCUMENTS

| | | | |
|---|---|---|---|
| 1,899,883 | * 2/1933 | Sacrey | 409/182 X |
| 5,016,691 | * 5/1991 | Bernier | 409/182 X |
| 5,285,831 | * 2/1994 | Woolgar | 144/136.1 X |
| 5,685,675 | * 11/1997 | Beekman | 409/180 |
| 5,725,038 | * 3/1998 | Tucker et al. | 144/371 |
| 5,909,987 | 6/1999 | Coffey et al. | 409/131 |

OTHER PUBLICATIONS

Spielman, P., "Router Jigs & Techniques," *Sterling Publishing Co., Inc.*, Front cover, Copyright page and pp. 74–76 (1988).

* cited by examiner

*Primary Examiner*—William Briggs
(74) *Attorney, Agent, or Firm*—Merchant & Gould P.C.

(57) ABSTRACT

The present disclosure relates to a dust-collection system for use with a power tool such as a router. The system includes a router sub-base adapted for connection to a router. The router sub-base defines an opening configured to receive a cutting tool of the router. The system also includes lower and upper vacuum flowpaths. The lower vacuum flowpath is arranged and configured to evacuate dust from beneath the opening of the router sub-base. The upper vacuum flowpath is arranged and configured to evacuate dust from within the opening of the router sub-base. The disclosure also relates to a system and method for aligning a template guide.

3 Claims, 10 Drawing Sheets

ROUTER TEMPLATE GUIDE ALIGNMENT SYSTEM AND METHOD

CROSS-REFERENCE TO RELATED APPLICATIONS

This application is a continuation-in-part of U.S. patent application Ser. No. 08/891,465 filed Jul. 10, 1997 U.S. Pat. No. 5,993,124.

FIELD OF THE INVENTION

The present invention relates generally to power tools for wood working. More particularly, the present invention relates to template guide mounting systems for routers.

BACKGROUND OF THE INVENTION

A router is a versatile power tool adapted to perform a variety of functions such as making grooves in wood, trimming or shaping edges, and making joints. A typical router includes an electric motor contained within a motor housing. The electric motor is operatively coupled to a collet configured for selectively retaining one of a plurality of cutting blades or bits. The router also includes a sub-base which is connected to the housing. The sub-base can be adjusted relative to the motor housing such that a bit retained in the collet can be set to project a desired distance through the sub-base. By activating the motor with the bit projecting through the sub-base, the router is adapted to perform routing functions on a work piece. The depth of cut provided by the router can be varied by altering the distance the cutting bit projects through the router sub-base.

SUMMARY OF THE INVENTION

One aspect of the present invention relates generally to a dust-collection system for use with a router. The dust-collection system includes a router sub-base adapted for connection to the router. The router sub-base defines an opening configured to provide clearance for a cutting tool of the router. The dust-collection system also includes a lower vacuum flowpath arranged and configured to evacuated dust from beneath the opening of the router sub-base. The dust-collection system further includes an upper vacuum flowpath positioned above the lower vacuum flowpath. The upper vacuum flowpath is arranged and configured to evacuate dust from within the opening defined by the router sub-base.

Another aspect of the present invention relates to a dust-collection system including a router sub-base that defines an evacuation channel configured for evacuating dust from the region proximate a collet opening defined by the sub-base. An upper evacuation conduit is in fluid communication with the evacuation channel. A top cover forms a partially enclosed upper vacuum chamber that is located above the collet opening of the router sub-base. Additionally, a bottom cover forms a partially enclosed lower vacuum chamber located below the collet opening of the router sub-base. A lower evacuation conduit is in fluid communication with the lower vacuum chamber. The upper and lower evacuation conduits are adapted for connection to one or more vacuum sources.

A further aspect of the present invention relates to a template guide mounting system and method that allow a template guide to be quickly and precisely aligned with a router bit.

The various aspects of the present invention provide a wood dust-collection system capable of capturing a large percentage of the dust generated by a router. Consequently, the present invention helps to reduce clean-up times and generate a more healthy work environment. Additionally, the present invention is designed to accommodate the various functions for which a router is typically used. For example, the present invention provides upper and lower vacuum systems that are particularly effective for collecting dust generated by routing functions performed along the edge of a work piece such as decorative edging and rabbiting. Additionally, for routing applications that are performed completely over a work piece, such as cutting a groove or dado, the bottom vacuum system can be removed such that dust evacuation is performed solely by the upper vacuum system. Such versatility is particularly suited for power tools such as routers, which have a variety of diverse uses. The present invention also provides a dust-collection system that can easily be used with existing router designs.

A variety of additional advantages of the invention will be set forth in part in the description which follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

FIGS. 1–4 illustrate an exemplary router dust-collection system 20 constructed in accordance with the principles of the present invention. Generally, the dust-collection system 20 includes an exemplary router sub-base 22 adapted for connection to a router. Alternately, the sub-base 22 could be integrated into a router or a router base system. The router sub-base defines central collet opening 24 configured to receive a collet and cutting bit of the router. The dust-collection system 20 also includes a lower vacuum flowpath 26 and an upper vacuum flowpath 28. The lower vacuum flowpath 26 is arranged and configured to evacuate dust from beneath the opening 24 of the router sub-base 22. The upper vacuum flowpath 28 is arranged and configured to evacuate dust from within the opening 24 of the router sub-base 22.

The exemplary router sub-base 22 of the dust-collection system 20 has a generally circular shape and has a size that typically corresponds with the size of router to which the sub-base 22 will be attached. Alternately, the router sub-base can be of other shapes familiar to those skilled in the art. For example, the sub-base may be configured with one or more linear edges or with offset portions for providing stability during routing operations.

Figure 2:
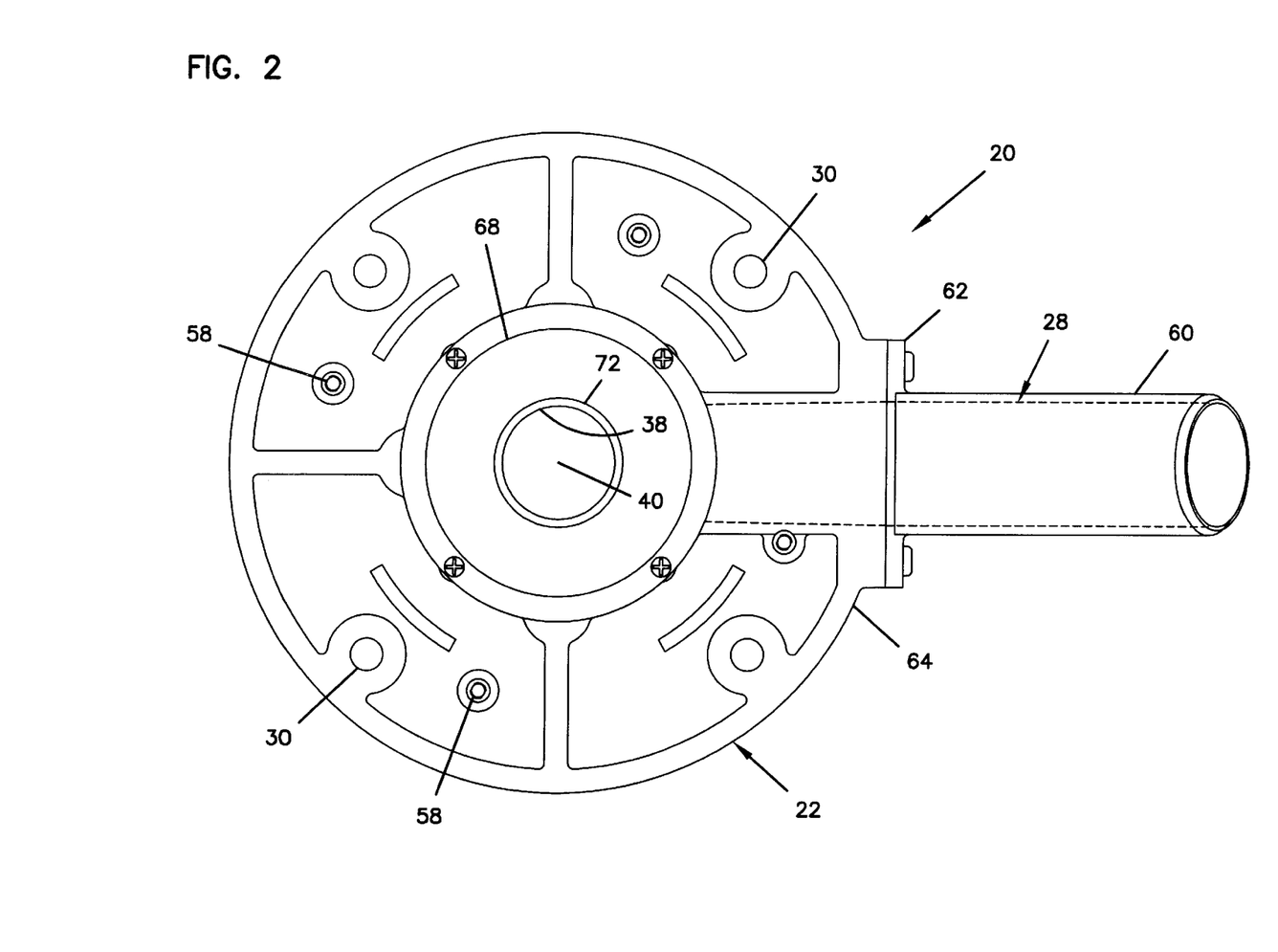
FIG. 2 is a top view of the dust-collection system of FIG. 1.
Figure 3A:
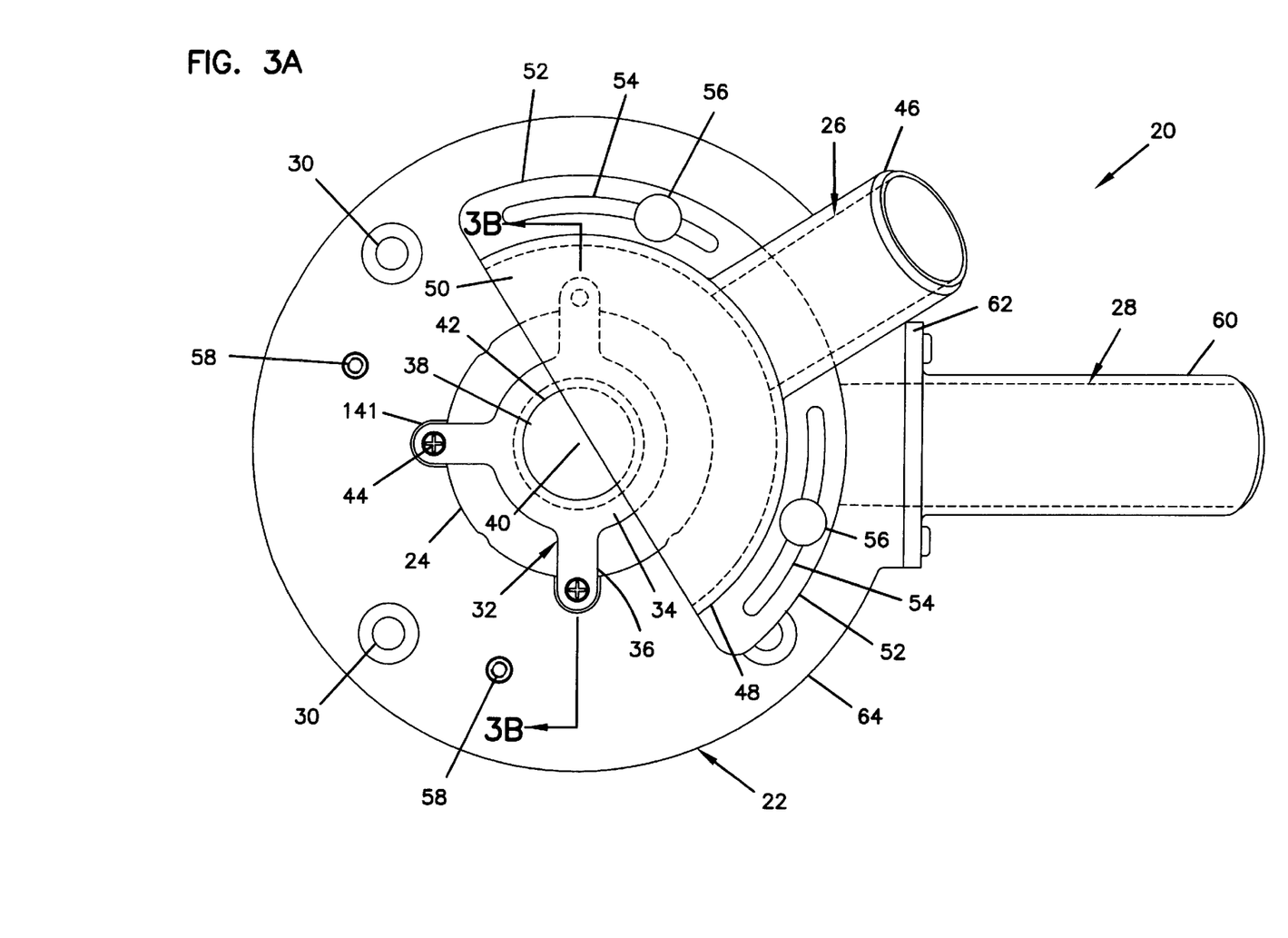
FIG. 3A is a bottom view of the dust-collection system of FIG. 1 with the bottom vacuum conduit pivoted to more clearly illustrate the top vacuum conduit.

The exemplary router sub-base 22 defines a plurality of bolt openings 30 configured to allow the sub-base 22 to be bolted to the base of a router. Of course, a variety of other conventionally known techniques could also be used to fasten the sub-base 22 to a router. As indicated previously, the sub-base can also be integrally formed to a router or a router base.

In FIG. 3A, an exemplary template guide holder 32 is shown mounted on the bottom of the router sub-base 22. The template guide holder 32 includes an annular portion 34 and three circumferentially spaced arms 36 that project radially outward from the annular portion 34. The annular portion 34 defines a central aperture 38 that is centered on a central axis 40 passing transversely through the router sub-base 22. The central aperture 38 is sized to receive a template guide and the upper surface of the annular portion 34 defines an annular shoulder 42 (shown in hidden line) configured to seat a conventional retaining nut used to secure the template guide to the template guide holder 32. The arms 36 of the template guide holder 32 have ends that are inset within semicircular recesses 141 defined by the bottom surface of the router sub-base 22. Screws 44 or other means are used to detachably connect the template guide holder 32 to the router sub-base 22. Also, the holder 32 can be integral with the sub-base 22.

Figure 3B:
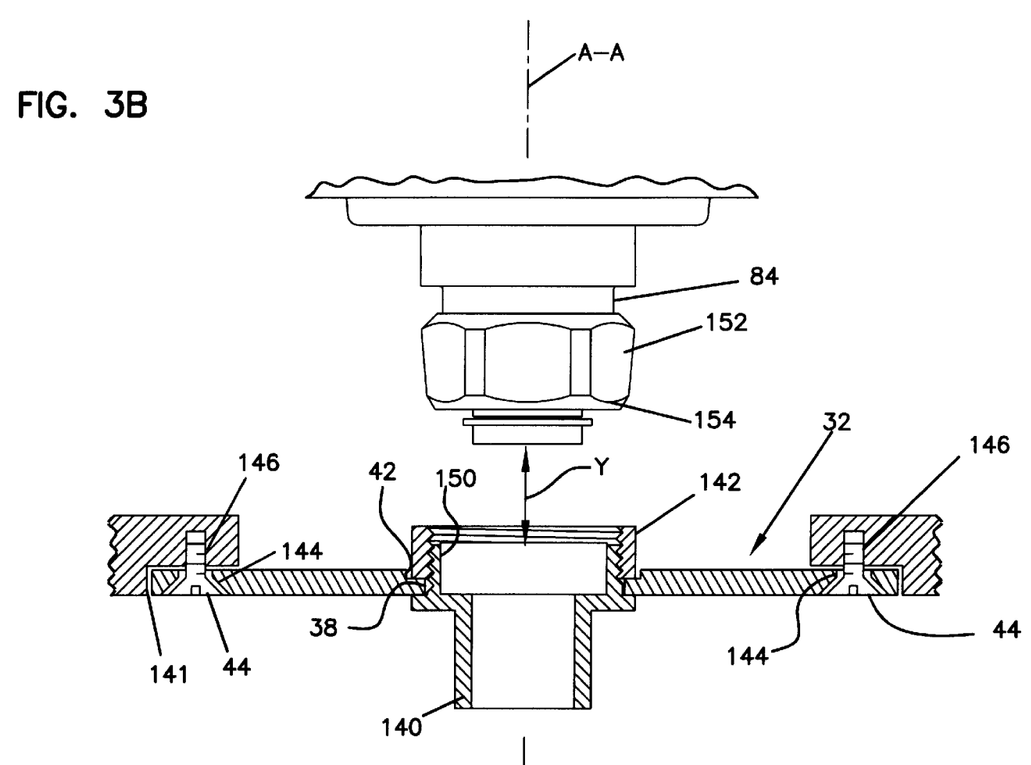
FIG. 3B is a cross-sectional view taken along section line 3B—3B of FIG. 3A.

FIG. 3B is a cross-sectional view illustrating a template guide 140 secured to the holder 32 by a nut 142. As shown in FIG. 3B, the screws 44 extend through openings 144 defined by the arms 36 of the holder 32. The openings 144 preferably have diameters that are larger than the diameters of shafts 146 of the screws 44. The openings 144 and the shafts 146 are preferably relatively sized such that when the screws 44 are loosened relative to the sub-base 22, the holder 32 can float or slide relative to the sub-base 22. In one particular embodiment of the present invention, the openings 144 are about 0.05 inch larger than the shafts 146. Also, the semi-circular recesses 141 are preferably larger than the ends of the arms 36 to allow the holder 32 to slide as described above.

The template guide 140 includes a guide portion 148 that extends below the holder 32, and a threaded portion 150 that extends upward through the central opening 38 of the holder 32. The nut 142 is threaded on the threaded portion 150 and seated against the shoulder 42. A conventional collet 84 is shown schematically above the template guide 140. The collet 84 includes a hex-nut 152 having a lower chamfered portion 154. The chamfered portion 154 includes an annular surface that is centered about a central axis A—A of the collet.

Once the template guide 140 is mounted on the holder 32, the template guide 140 can be manually aligned relative to the collet 84. A preferred technique for aligning the template guide 140 relative to the collet 84 involves first loosening the screws 44 such that the holder 32 is free to slide, float, or otherwise move in a dimension X relative to the sub-base 22. Next, the collet 84 is moved downward in a dimension Y toward the template guide 140 such that the chamfered portion 154 engages and generally fits within the nut 142. As the chamfered portion 154 engages the nut 142, the holder 32 slides in the dimension X relative to the sub-base 22 allowing the nut 142 and template guide 140 to move into a concentric relationship with respect to the hex-nut 152. In such a concentric relationship, the template guide 140 is aligned with the collet 84. For example, the template guide 140 is centered about the central axis A—A of the collet 84. Once the template guide 140 is properly aligned, the screws 44 are re-tightened to retain or lock the holder 32 in the aligned position. It will be appreciated that a cutting bit (not shown) can be mounted within the collet 84 either before or after the above-described alignment process.

As shown in FIG. 3B, the hex-nut 152 engages the nut 142 to achieve alignment. In will be appreciated that depending upon the size on the nut 142 and the distance the threaded portion 154 of the template guide 140 extends above the holder 32, the hex-nut 152 may engage the template guide 140 itself to achieve alignment.

Figure 1:
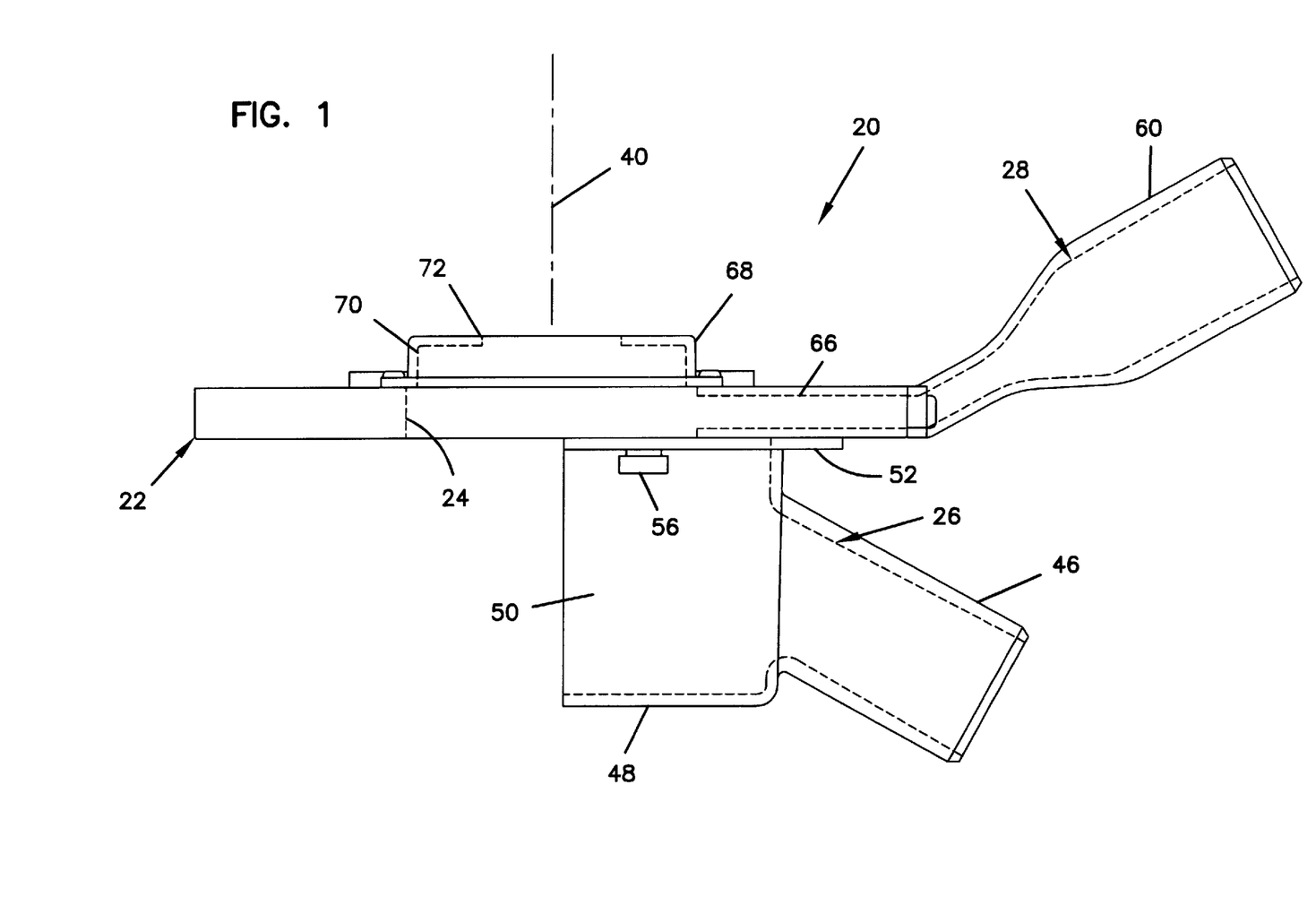
FIG. 1 is a side view of a router dust-collection system constructed in accordance with the principles of the present invention.
Figure 4:
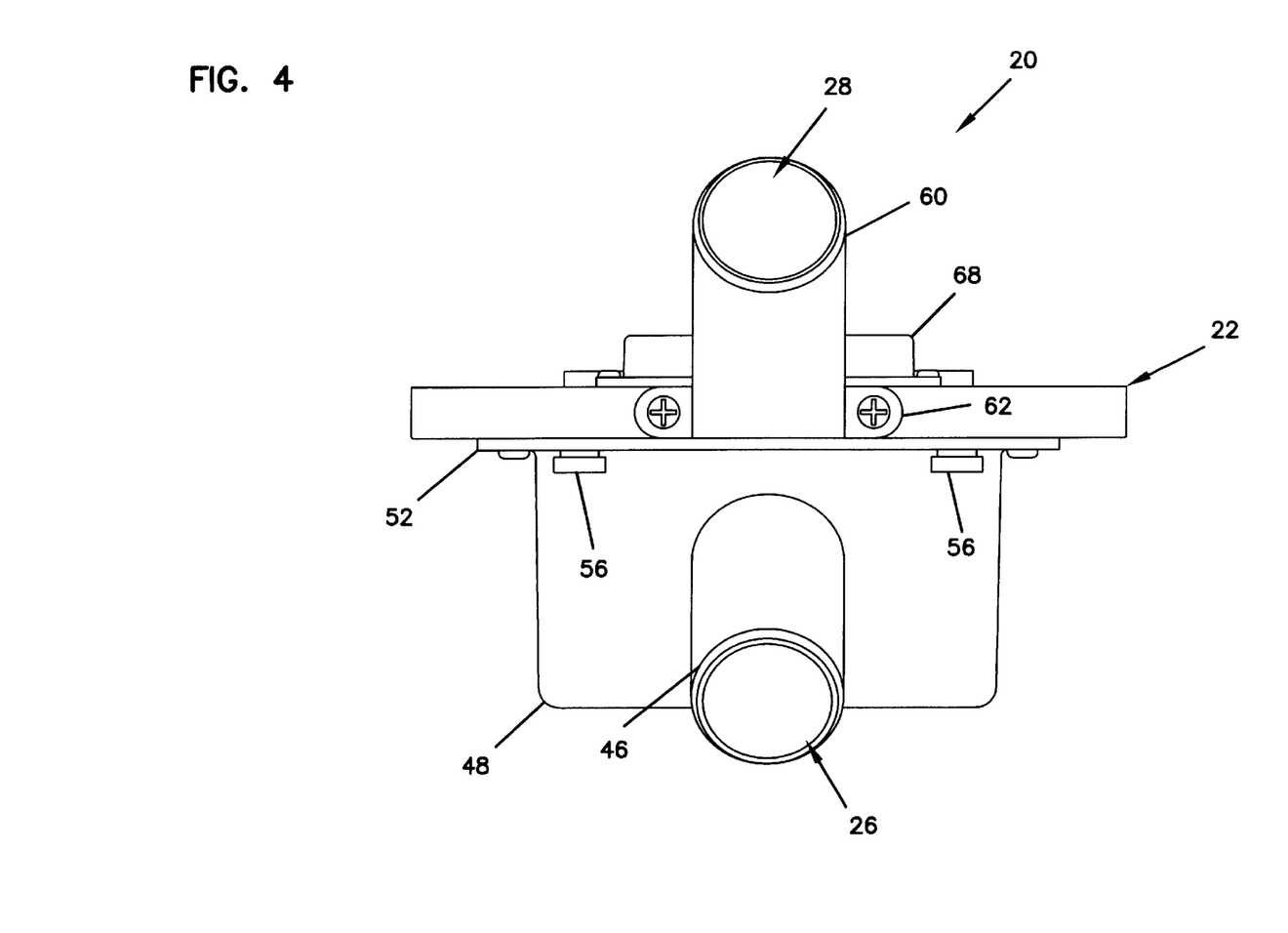
FIG. 4 is a rear view of the router dust-collection system of FIG. 1.

The lower vacuum flowpath 26 of the dust-collection system 20 is partially formed by a lower evacuation conduit 46 adapted for connection to a source of vacuum. The lower evacuation conduit 46 is integrally formed with a bottom cover 48 that partially covers the collet opening 24 and that defines a partially enclosed lower vacuum chamber 50 that is in fluid communication with the lower evacuation conduit 46. The bottom cover 48 includes a radial flange 52 that abuts the bottom surface of the router sub-base 22. Arcuate slots 54 are defined within the annular flanges 52. The bottom cover 48 is connected to the bottom of the sub-base 22 by set screws 56 that pass through the arcuate slots 54 and are threaded within tapped holes 58 formed in the sub-base 22. By loosening the set screws 56, the bottom cover 48 can be pivoted about the central axis 40 to adjust the orientation of the lower evacuation conduit 46. The sub-base 22 includes four separate tapped holes 58. By selecting the appropriate holes 58, the bottom cover 48 can be pivoted 360° about the central axis 40.

The upper vacuum flowpath 28 of the dust-collection system 20 is partially formed by an upper evacuation conduit 60 adapted for connection to a source of vacuum. The upper evacuation conduit 60 has a flange 62 that abuts and is fastened by means such as screws to a periphery 64 of the router sub-base 22. The upper evacuation conduit 60 projects radially outward from the periphery 64 of the sub-base 22 and is in fluid communication with an evacuation channel 66 defined by the sub-base 22. The evacuation channel 66 extends radially from the central collet opening 24 of the sub-base 22 toward the sub-base periphery 64. Consequently, the evacuation channel 66 is arranged and configured for evacuating dust from within the central collet opening 24 of the sub-base 22.

As shown in the FIG. 1, the upper conduit 60 projects radially outward and upward from the sub-base 22. It will be appreciated that the upper conduit 60 can also be oriented to extend radially outward and downward from the sub-base 22. Additionally, the various components of the dust-collection system 20 can also be integrally formed as a single piece unit.

The dust-collection system 20 also includes a top cover 68 fastened to the top side of the router sub-base 22. The top cover 68 covers the central collet opening 24 of the sub-base 22 and defines a partially enclosed upper vacuum chamber 70 located above the opening 24. The top cover 68 also defines a cover opening 72 that is centered on the central axis 40.

Figure 5:
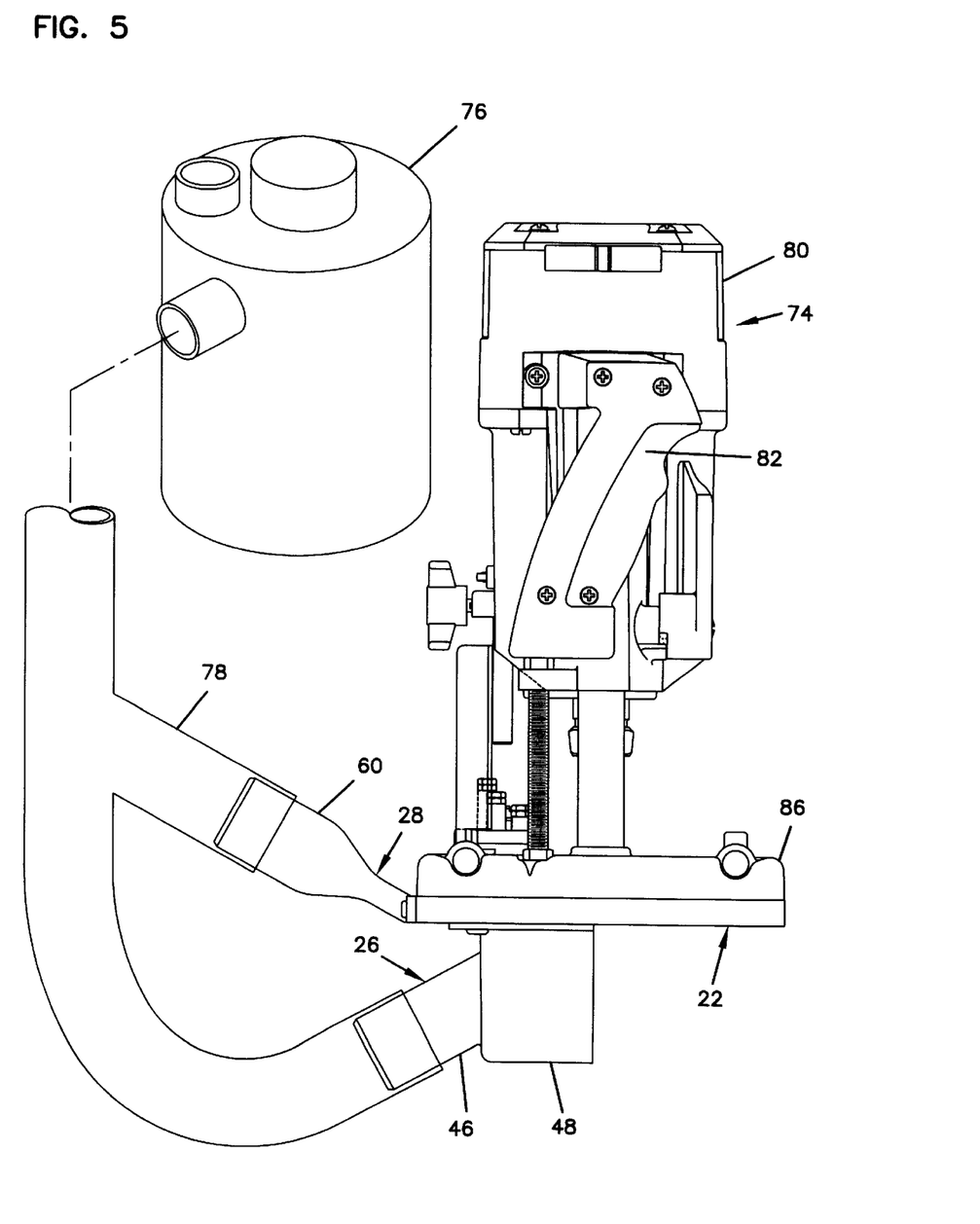
FIG. 5 shows the router dust-collection system of FIGS. 1–4 mounted on a router, vacuum hoses are shown connected to the dust-collection system.
Figure 6:
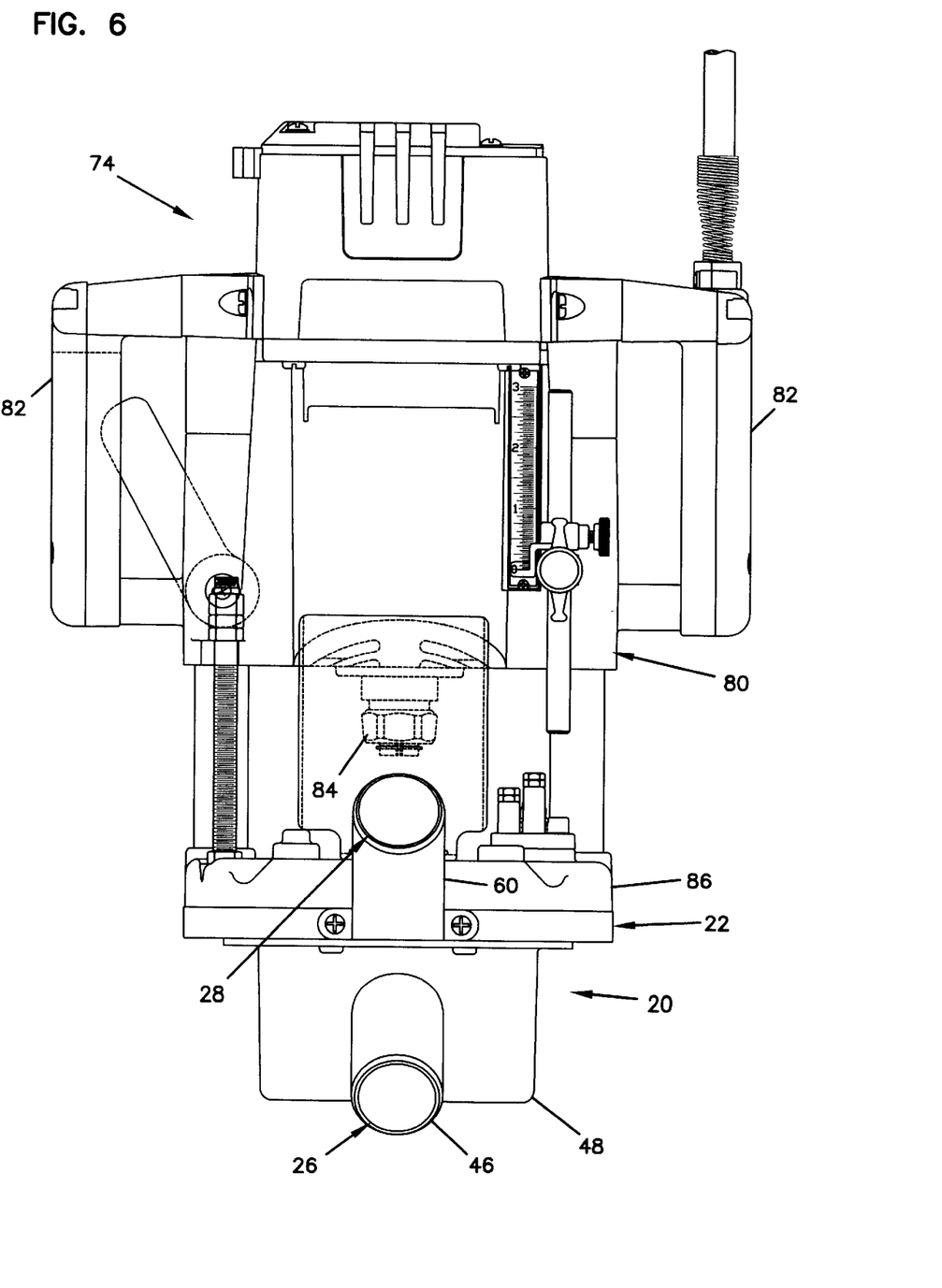
FIG. 6 is a front elevational view of the router of FIG. 5, the dust-collection system is shown with the vacuum hoses removed.
Figure 7:
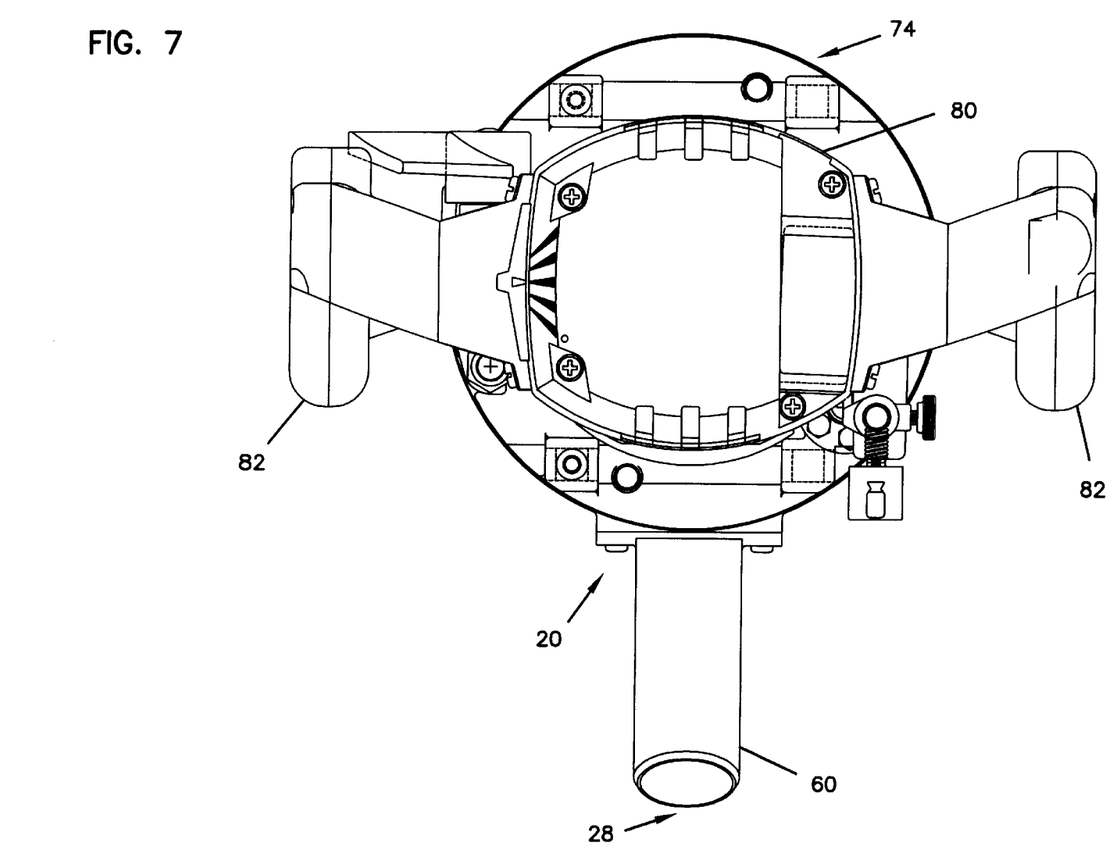
FIG. 7 is a top view of the router of FIG. 5, once again the vacuum hoses have been removed from the dust-collection system.

FIGS. 5–7 show the dust-collection system 20 mounted on a router 74. As shown in FIG. 5, the lower and upper vacuum flowpath 26 and 28 are connected to a single source of vacuum source 76 by a Y-connector 78. The Y-connector 78 may have a flexible or rigid configuration. For ease of illustration, the connector 78 is shown extending upward from the router 74. However, for most applications, the connector 78 will extend generally downward from the router 74 to minimize interference with an operator. It will be appreciated that the lower and upper vacuum flow paths 26 and 28 could also be connected to separate vacuum sources and could be independently operated.

As shown in FIGS. 5–7, the router 74 comprises a plunge router having a motor housing 80 equipped with handles 82. A collet, such as collet 84, is operatively connected to a motor within the housing 80. The router 74 also includes a base 86 configured for connection to a sub-base.

Although the router 74 shown in FIGS. 5–7 comprises a plunge router, it will be appreciated that the dust-collection system 20 is adapted to be used with a variety of different types of routers. For example, the dust-collection system is adapted for use with the Porter Cable Model No. 100 ⅞ horsepower router, the Porter Cable Model No. 691 1½ horsepower D-handle router, the Porter Cable Model No. 693 1½ horsepower plunge router, the Porter Cable Model No. 7536 Speedmatic® 2½ horsepower router, the Porter Cable Model No. 7537 Speedmatic® 2½ horsepower D-handle router, the Porter Cable Model No. 7538 Speedmatic® 3½ horsepower plunge router, the Porter Cable Model No. 7539 Speedmatic® 3¼ horsepower 5-speed plunge router, the Porter Cable Model No. 7518 Speedmatic® 3¼ horsepower 5-speed router, and the Porter Cable Model No. 7519 Speedmatic® 3¼ horsepower router. Of course, the above-identified routers are strictly illustrative and dust-collection systems constructed in accordance with the principles of the present invention can be used in combination with any number of other routers as well as with routers mounted to fixtures or jigs such as router tables.

In use, the exemplary dust-collection system 20 is mounted on the router 74 by removing an existing sub-base of the router 74 and replacing the existing sub-base with the router sub-base 22. As mounted on the base 86 of the router 74, the collet opening 24 defined by the sub-base 22 is configured to receive the collet 84 of the router 74. One skilled in the art will recognize that the dust-collection system 20 can be oriented such that the lower and upper conduits 46 and 60 together or individually project outward from the front, back or sides of the router. The particular orientation of the conduits 46 and 60 depends upon the preference of the user and the routing function desired to be performed.

When performing routing functions, a bit secured within the collet 84 projects downward through the collet opening 24 defined by the router sub-base 22. For certain applications, the lower and upper vacuum flowpaths 26 and 28 can be used in combination to extract dust generated by the router 74. For example, the dual use of the lower and upper vacuum flow paths 26 and 28 is effective when forming decorative edges or rabbeting. For applications in which substantially the entire bottom surface of the router sub-base 22 is required to abut a work piece, such as forming grooves or dados, the bottom cover 48 can be removed from the sub-base 22 and the upper vacuum flowpath 28 can solely be used to evacuate dust generated by the router 74.

Figure 8:
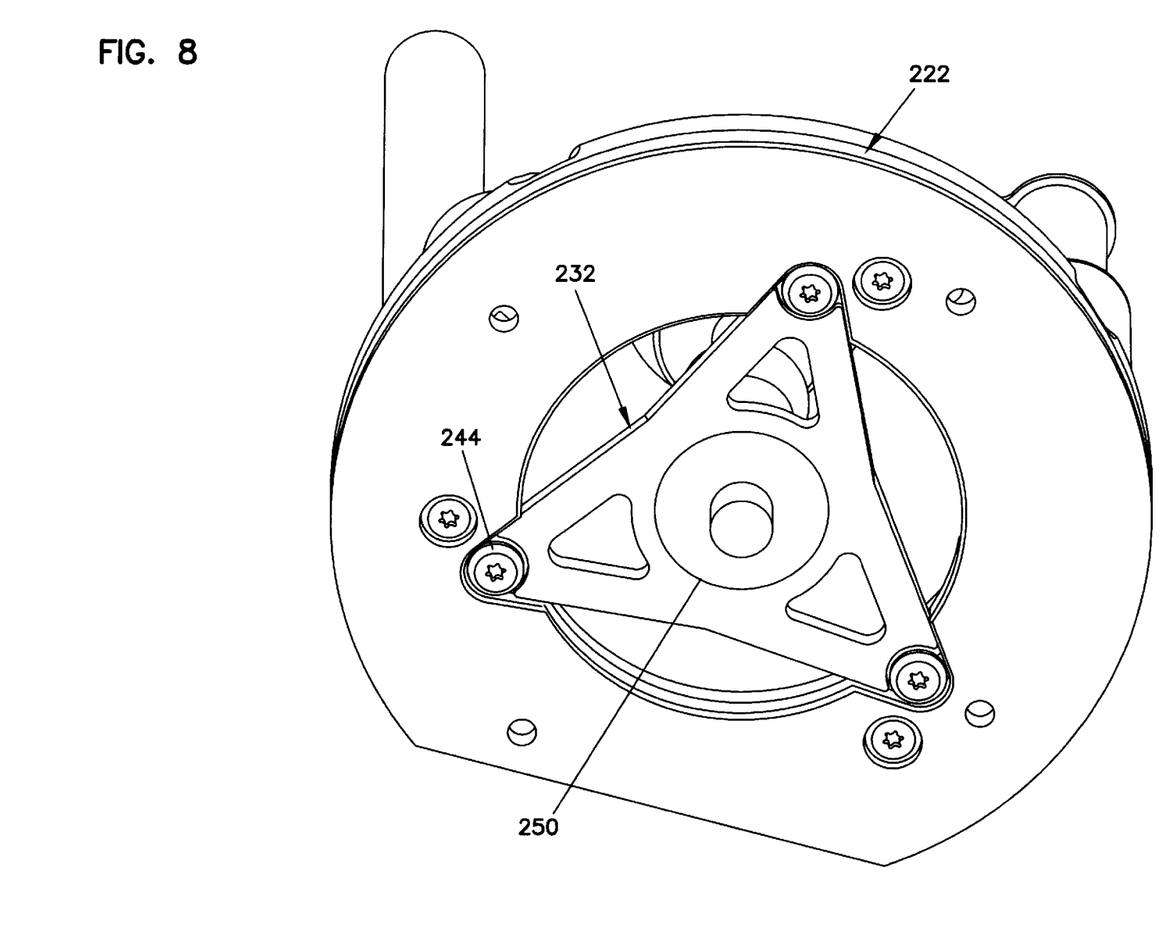
FIG. 8 is a perspective view of an alternative embodiment of a template guide holder constructed in accordance with the principles of the present invention.

FIG. 8 is a perspective, bottom view of an alternative sub-base 222 having an alternative template guide holder 232. The template guide holder 232 is secured to the sub-base 222 by bolts or screws 244 that extend through openings 246 (shown in FIGS. 9 and 10) defined by the holder 232. The openings 246 are preferably larger than that shafts of the screws 244 such that when the screws are loosened, the holder 232 can slide laterally relative to the sub-base 222. A template guide 250 is secured to the holder 232 by a retaining nut 252.

Figure 9:
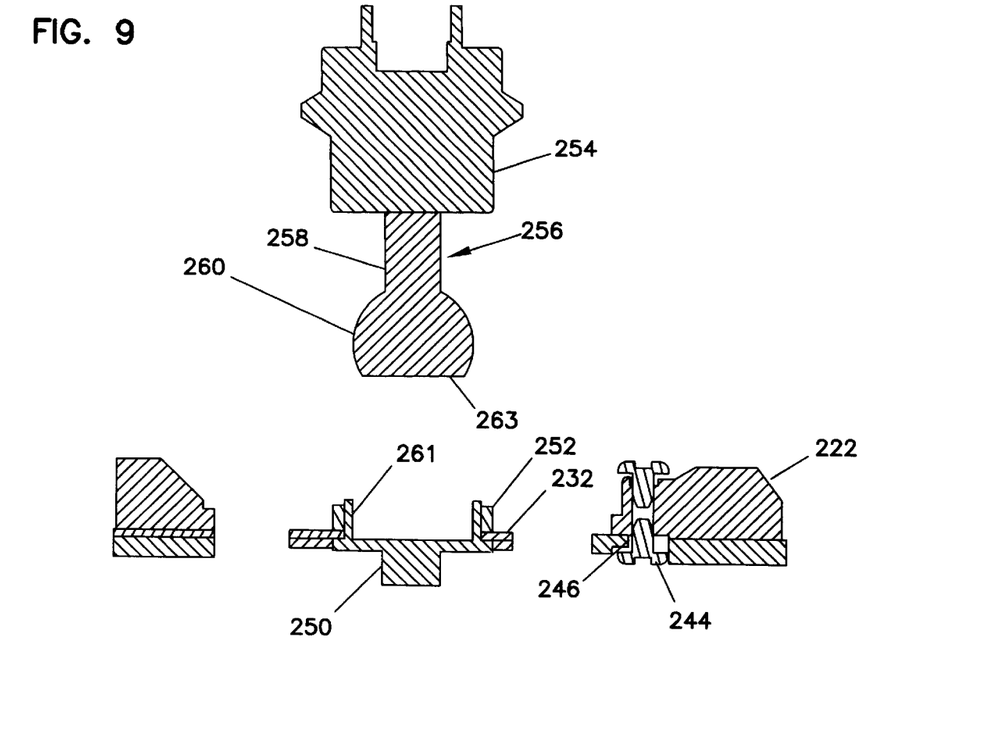
FIG. 9 is a cross-sectional view through the template guide holder of FIG. 8, a collet is shown in a raised position.
Figure 10:
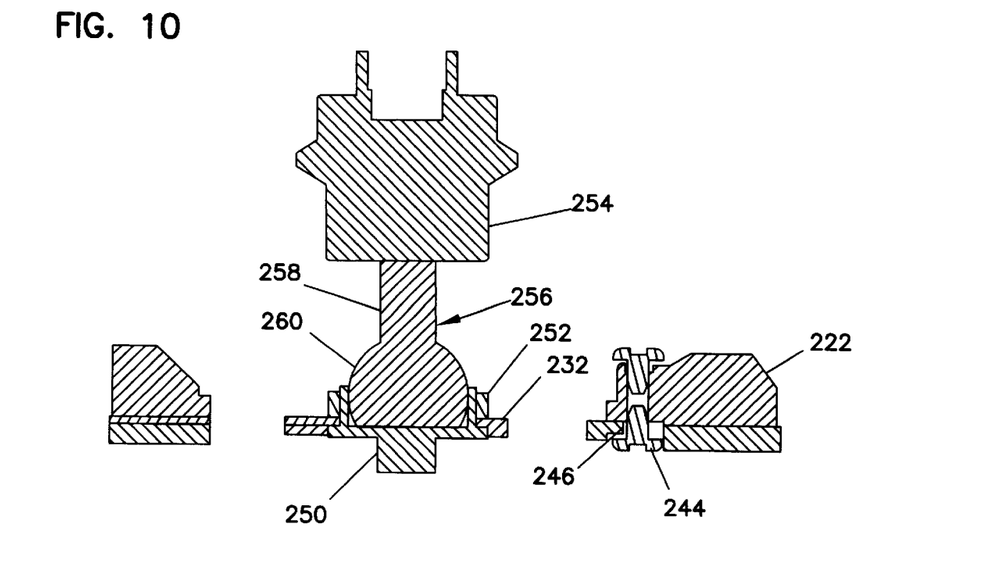
FIG. 10 is a cross-sectional view through the template guide holder of FIG. 8, the collet is shown in a lowered position.

FIGS. 9 and 10 show a wrench-less collet 254 positioned above the template guide 250. An alignment tool 256 is mounted within the collet 254 in place of a bit. The alignment tool 256 includes a shaft 258 clamped within the collet 254. An alignment portion 260 of the tool 256 is located at a lower end of the shaft 258. The alignment portion 260 is sized and shaped to fit within a top end portion 261 of the template guide 250. In certain embodiments of the present invention, the alignment portion 260 is enlarged as compared to the shaft 258 and includes chamfered or ramped portions adapted to engage an inner edge or surface of the top end portion 261. As shown in FIGS. 9 and 10, the alignment portion 260 has a generally truncated spherical shape with a generally flat lower surface 263 that is generally transversely aligned with respect to the shaft 258.

With the template guide 250 secured to the holder 232, the template guide 250 can be aligned with the collet 254 by using the alignment tool 256. For example, with the collet 254 raised relative to the holder 232, the alignment tool 256 can be mounted in the collet 254. The screws 244 are then loosened to allow the holder 232 to slide relative to the sub-base 222. Next, the collet 254 is moved downward toward the template guide 250 such that the alignment portion 260 engages and fits within the template guide 250. Contact between the alignment portion 250 and the top end portion 261 of the template guide 250 forces the template guide 250 toward a concentric or aligned position relative to the shaft 258. The sliding relationship between the holder 232 and the sub-base 222 allows the template guide 250 to move laterally relative to the alignment tool 256 to achieve alignment.

After the template guide 250 has been aligned relative to the collet 254, the screws 244 are re-tightened to lock or retain the template guide holder 232 in place. With the template guide holder 232 held in place by the tightened screws 244, the alignment tool 256 can be removed from the collet 254 and replaced with a bit (not shown).

With regard to the foregoing description, it is to be understood that changes may be made in detail, especially in matters of the shape, size and arrangement of the parts without departing from the scope of the present invention. It is intended that the specification and depicted aspects be considered exemplary only, with a true scope and spirit of the invention being indicated by the broad meaning of the following claims.

What is claimed is:

1. A method for aligning a template guide relative to a router collet, the template guide being secured to a sub-base of the router by a template guide holder, the method comprising:

loosening a connection between the template guide holder and the router sub-base such that the template guide holder can move relative to the sub-base;

using the collet to force the template guide toward an aligned position by moving the collet toward the template guide such that an alignment structure moved with the collet forces the template guide toward the aligned position, wherein the template guide holder slides relative to the sub-base to allow the template guide holder to move to the aligned position, the alignment structure being pressed within a retaining nut that secures the template guide to the template guide holder; and tightening the connection between the template guide holder and the sub-base after the template guide has been aligned with the collet.

2. The method of claim 1, wherein the alignment structure comprises a chamfered portion of a nut secured to the collet.

3. The method of claim 1, wherein the template guide holder includes a central region for holding the template guide, and a plurality of legs that project radially outward from the central region for connecting the holder to the router sub-base.

* * * * *